United States Patent

[11] 3,581,019

[72] Inventor Donald P. Ryan
Bloomfield, N.J.
[21] Appl. No. 748,813
[22] Filed July 30, 1968
[45] Patented May 25, 1971
[73] Assignee Cessna Aircraft Company
Wichita, Kans.

[54] CARD CONTROL OF RADIO TELEPHONE
3 Claims, 10 Drawing Figs.

[52] U.S. Cl. 179/41, 179/90, 179/189
[51] Int. Cl. H04g 7/04
[50] Field of Search 230/61.12, 61.78, 61.106; 200/46; 179/41 (A)

[56] References Cited
UNITED STATES PATENTS

| | | | |
|---|---|---|---|
| 3,286,040 | 11/1966 | Andregg et al. | 179/90 |
| 3,351,714 | 11/1967 | Kunzelman et al. | 179/41 |
| 3,387,270 | 6/1968 | Aldhoch et al. | 340/164 |
| 3,432,645 | 3/1969 | Hartmann | 200/46 |
| 3,458,664 | 7/1969 | Aldhoch et al. | 179/41 |

*Primary Examiner*—William C. Cooper
*Assistant Examiner*—Jan S. Black
*Attorney*—Browne, Schuyler & Beveridge

ABSTRACT: Card control of radiotelephone facility. A matrix circuit receives a card, which is apertured, punched or embossed in accordance with the number which the radiotelephone equipment is to respond, the channels in which it is to be operative, to complete transmitter and receiver circuits therefor, and disable channels not used and otherwise control use of the facility by authorized persons. Other features of the invention are disclosed in the specification and drawings.

INVENTOR
DONALD P. RYAN

BY Browne, Schuyler & Beveridge
ATTORNEYS

CARD CONTROL OF RADIO TELEPHONE

This invention relates in general to radiotelephone units and particularly to card control for mobile radiotelephone units.

There are several nationwide car rental agencies where travelers can rent an automobile or other vehicle and in some cases it is desirable that such vehicle have available telephone facilities. Automobiles provided by car rental agencies do not normally have mobile radiotelephone capabilities primarily because of the difficulties in controlling the use of such telephones by the person renting the car or unauthorized persons. Owners of large fleets of vehicles sometimes desire to have their vehicles equipped with a radiotelephone facility but desire that only authorized persons utilize the telephone facility while other persons may be authorized to use the vehicle but not the telephone facility. While the invention is primarily for use with mobile radiotelephone equipment, it may also be applied to fixed radiotelephone facilities.

In accordance with the present invention, a vehicle will have a mobile radiotelephone facility installed therein. In the case of a car rental agency the person renting the car would be given a punched or embossed card which, when inserted in a card guide slot in the mobile radiotelephone facility installed in the vehicle would, through a card controlled crossbar matrix arrangement, render operable circuits within the receiver corresponding to a selected telephone number so that that facility responds to that number when called. In any one city, mobile radio equipment normally can only use a limited number of the channels normally available. The card would activate the channels for both transmitter and receiver but the card would disable the unusable channels for any given area. In addition the card may have a series of coded apertures or embossments which serve as a "key" to turn on the power supply. Credit card customers of a car rental agency could have included in their cards the same number so that one card could be used on a nationwide basis.

Another feature of the invention is a solenoid operated by the ignition key of a vehicle to control insertion and withdrawal of the card. Such solenoid would only prevent insertion of the card unless the ignition key was turned on and prevent withdrawal of the card once the ignition key was removed.

It is the object of this invention to provide a radiotelephone unit controlled by an apertured or embossed card or like device.

This and other objects of the invention are accomplished in a manner fully described hereinafter in connection with the following description of the drawings in which.

Figure 1:
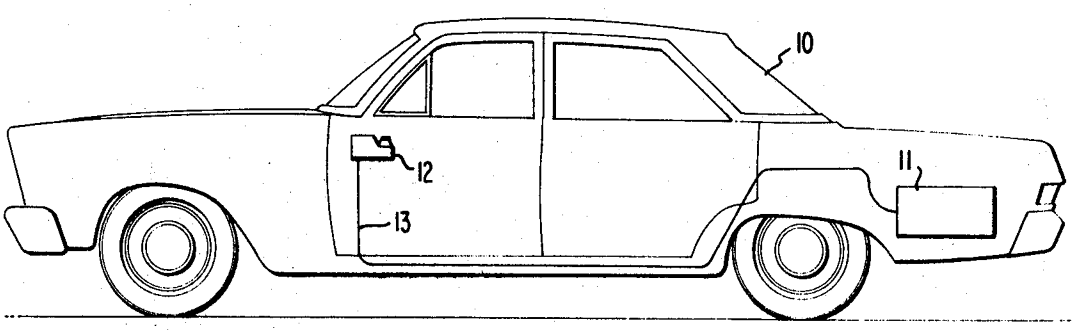
FIG. 1 is a diagrammatical illustration of an automobile equipped with a mobile radio telephone unit.

With reference to FIG. 1, a vehicle, which may be an automobile, boat, airplane or like vehicle is equipped with a mobile radiotelephone unit. In the case of an automobile a typical installation consists of a transceiver and supervisory package 11 normally mounted in the trunk of the automobile, such transceiver and supervisory package being controlled by a remotely located telephone control head or subset 12 mounted in the passenger compartment of the automobile and interconnected with the transceiver and supervisory package 11 by cabling 13. The transceiver and supervisory package is connected to an exteriorally mounted antenna (not shown). Transceiver and supervisory package 11 contains wiring for normal mobile radiotelephone equipment and which are conventional and are not disclosed in detail in this specification except to the extent necessary for an understanding of the present invention.

Figure 2:
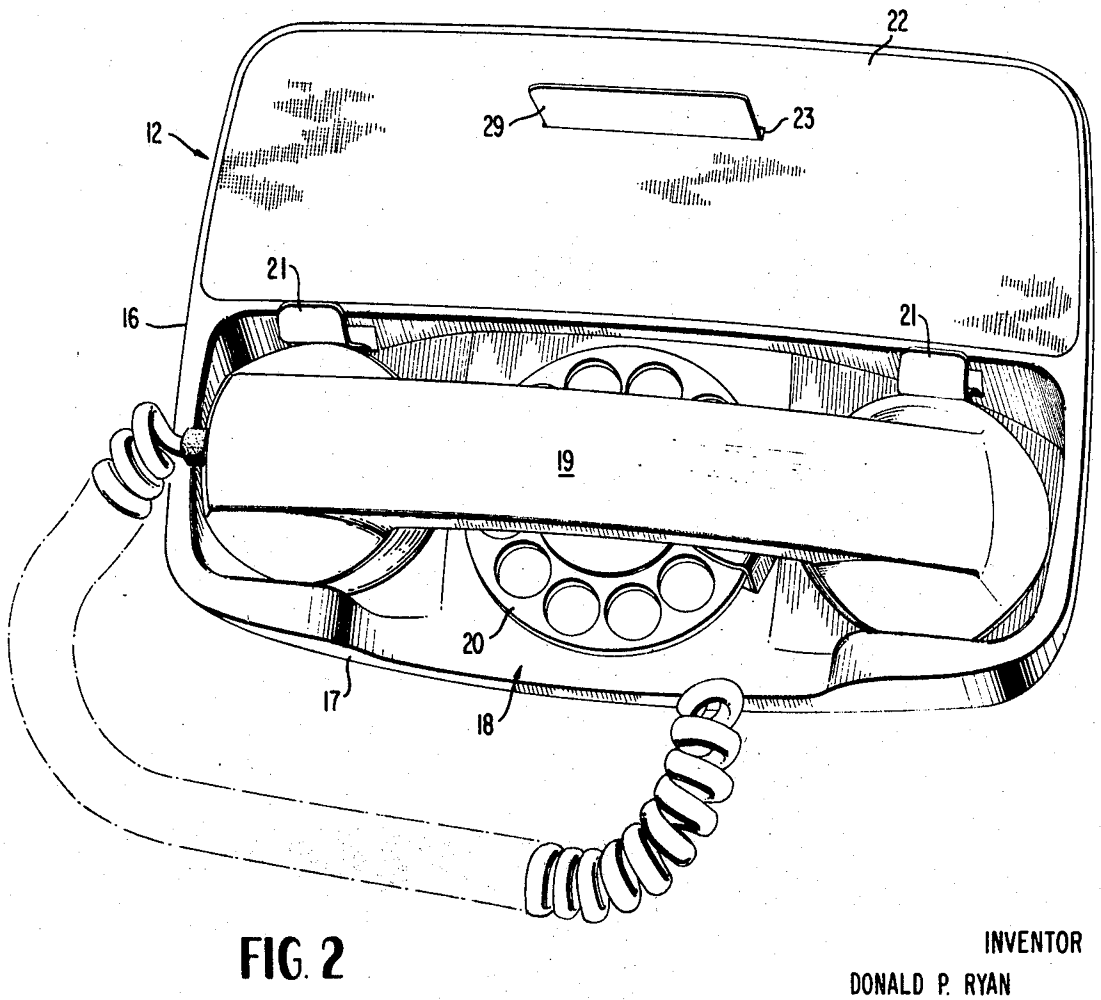
FIG. 2 is an isometric view of a handset unit of a mobile radiotelephone incorporating the invention.

Telephone control head 12 shown in FIG. 2 has a molded casing 16 with a downwardly sloping front portion 17 having a recess 18 adapted to receive a conventional telephone handset 19. In the center of recess 18 is a conventional dial assembly 20 and the conventional on-off control switch members 21 are provided to activate the telephone to circuitry to be described thereinafter. When a card has been inserted in the unit, handset 19 and dial assembly 20 operate in conventional manner, and need not be described in detail except to the extent such units are rendered operable through the invention hereof.

A top panel 22 is secured to the upper horizontal portion of housing 16 and has therein a slot 23 to permit the guided insertion of a control card 29 into a crossbar matrix (described more fully hereinafter) located in telephone control head 12. It will be appreciated that the guiding of control card 29 into the crossbar matrix is such that when fully inserted the aperture or embossment positions are properly aligned with matrix cross-points.

Figure 3:
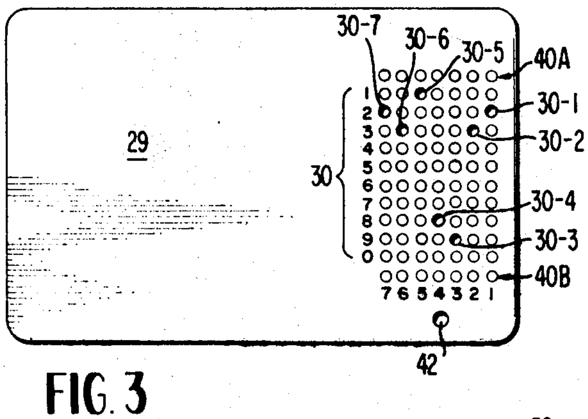
FIG. 3 is a diagrammatical illustration of a control card as used in the invention.

In FIG. 3 is disclosed a control card 29 of conventional plastic construction which may have an authorized person's name, address, card number, etc. printed or embossed thereon. For purposes of clarity such printed material and/or embossments are not disclosed or shown in FIG. 3. On the right-hand end of control card 24 are a series of seventy (or more or less) possible aperture or embossment positions 30 arrayed in 10 rows (for the digits 1, 2, 3, 4, 5, 6, 7, 8, 9 and 0) and seven vertical columns. In the disclosed embodiment holes or apertures are used instead of embossments or other protuberances on the card and there will be an aperture or hole formed for one position only within a vertical column. There being seven columns, any multidigit telephone number (up to seven) may be coded in the card by providing an aperture in each column at the row corresponding to the digit. The invention will be described in connection with a seven digit number, it being understood that a standard five digit radiotelephone number can be used with equal facility. Thus, in column 1, an aperture or hole 30–1 has been formed in the plastic card 29 in row 2. In vertical column 2, a hole 30–2 has been formed in row 3, in column 3, a hole 30–3 has been formed in row 9, in column 4, hole 30–4 is formed in row 8, in column 5, hole 30–5 is formed in row 1, in column 6, hole 30–6 is formed in row 3, and in column 7, hole 30–7 is formed in row 2. With card 29 thus punched, apertures or holes 30–1 through 30–7 correspond to the seven digit number 239–8132. It is apparent that any other seven digit number (or even a number having more or less digits) may be coded in this fashion. Such coding arrangement is, per se not novel and has been known heretofore in automatic telephone dialing systems, credit card systems etc.

Aperture positions 40–A and 40–B in the two outer rows of aperture positions shown in card 29 are used to select a desired channel and to prevent operation on any channel which is not available for use, and if desired one of rows 40 may be punched in accordance with a code to control activation of the facility. The reading of these holes for channel information etc. is the same as the reading of a telephone number.

In addition to the hole coding arrangement, a further aperture 42 is formed in card 29 through which may pass a plunger 102 (FIG. 10) or part operated by solenoid 101 upon turning on of the vehicle ignition switch 103 for example, as described more fully hereinafter.

Figure 4:
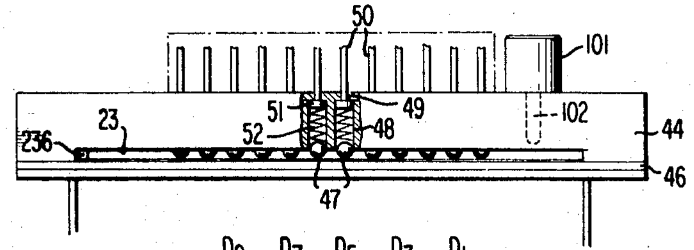
FIG. 4 is a cross-sectional view of control card receiving and control unit incorporated in the invention.
Figure 5:
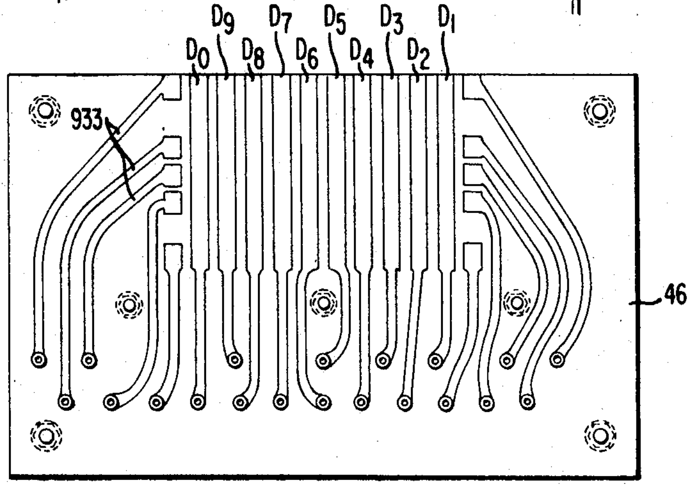
FIG. 5 is a portion of the card control unit showing a group of metal strips or conductors etched on a printed circuit board.
Figure 6:
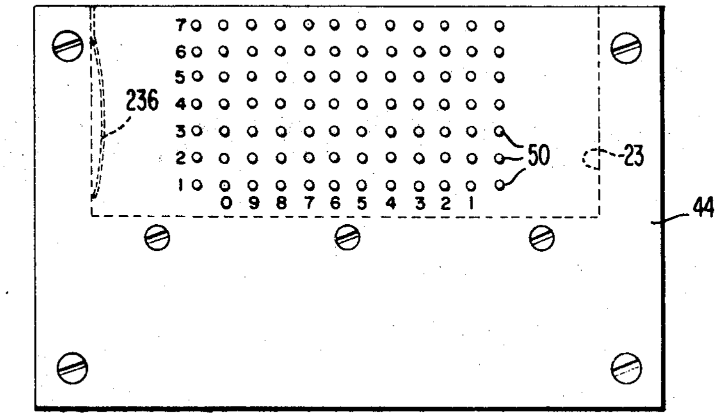
FIG. 6 is a plan view of another portion of a second half of the card control unit.

The control card receiving unit and crossbar matrix structure is disclosed in detail in FIGS. 4, 5 and 6 and primarily is composed of two parts 44 and 46. Part 44 is an insulated frame member carrying a plurality of spring biased ball contact elements 47, there being one spring-biased ball contact element 47 for every possible card aperture position. Thus, to accommodate a seven digit telephone number, there are seventy such spring-biased ball units 47. Each spring-biased ball assembly 47 is mounted in an aperture 48 having a reduced portion 49 passing through member 44. A conductor 50 having a conductor bead 51 engaged with a biasing spring 52 electrically connects ball 47 to conductor 50 each conductor 50 being connected to an appropriate crossbar conductor 55–64 in the matrix. Spring 52, in addition to serving as a conductor, biases or urges ball 47 outwardly toward an etched or printed circuit board 46. Circuit board 46 carries a plurality of conductor strips $D_1$–$D_0$ inclusive, the length of each such conductor strip being such as to encompass the rows of spring-biased ball contact elements 47. Without a card 29 in the device, all spring-biased ball contact elements 47 contact conductor strips $D_1$–$D_0$ with the ball elements in row 1 (FIG. 6) contacting conductor element $D_1$, row 2 ball contact elements, conductor element $D_2$ etc. The spring ball contact elements 47 and conductor element $D_1$–$D_0$ on the conductors on the printed circuit board from a crossbar switch or matrix each cross-point of which is made or broken with a punched card. In effect then the elements 44 and 46 with punched card 29 form an electromechanical number selection matrix which determines the number to which the mobile telephone unit will respond.

Figure 8:
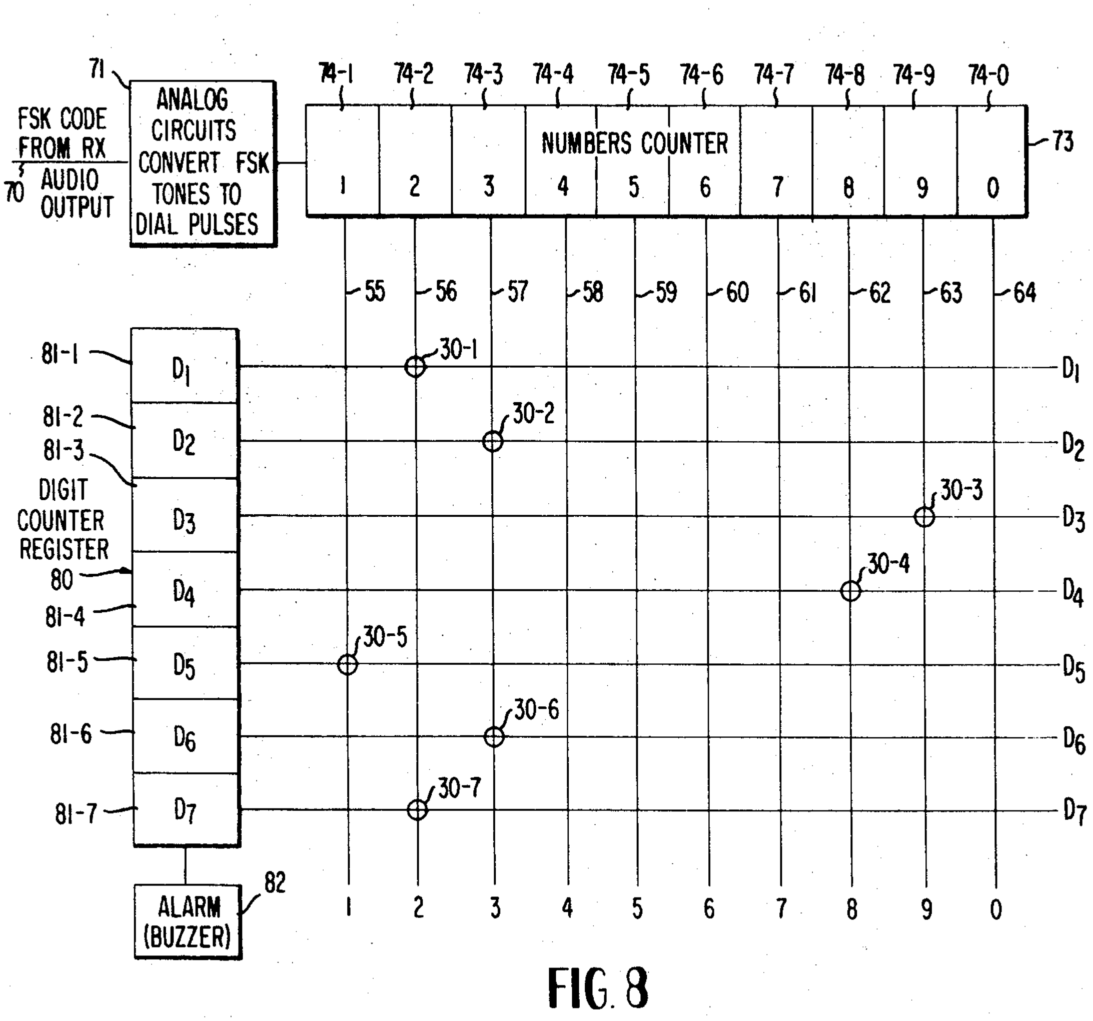
FIG. 8 is a partial circuit diagram of the crossbar circuitry incorporated in the invention.

Such electromechanical number selection matrix is shown in FIG. 8 in diagrammatic form, the circles 30–*n* representing an aperture in the card making a connection between individual cross points. Thus, the number 239–8132 (a number for which card 29 has been punched) is made, for the first digit of the number by a cross connection between crossbar conductor 56 and digit bar $D_1$, for a second number between crossbar conductor 57 and digit bar $D_2$, for the third number a connection between conductor 63 and digit bar $D_3$, for the fourth number a connection between conductor 62 and digit bar $D_4$, etc. for the seven digits of the number. As shown in FIG. 8 the cross connections in the matrix is set up for the telephone number 239–8132.

Figure 7:
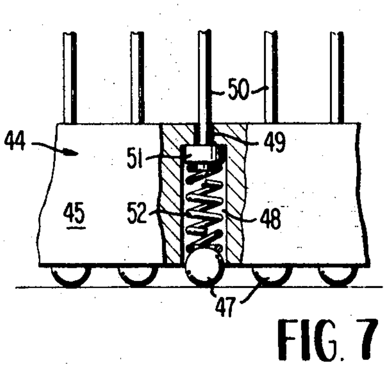
FIG. 7 is a cross-sectional view of a contact element of FIG. 6 taken on lines 7–7.

The input on line 70 to the matrix is basically from the audio output from the transceiver circuitry which, normally, is in the form of a frequency shift key coding. This signal is applied to an analog circuit 71 which converts the frequency shift tone signals into dial pulses in conventional manner. The output of analog circuit 71 is applied through lead 72 to a numbers counter 73. Numbers counter 73 comprises a series of counter or register storage elements 74–1 through 74–0 which correspond to the digits 1, 2, 3 ... 0, respectively. Crossbar conductors 55, 56 —64 are each coupled to a selected corresponding cross-point position by means of the spring-biased ball contact element 47 (FIG. 7). At each cross point where there is a connection made by a hole in a punched card, an engaged or contacted digit conductor supplied a signal to a corresponding digit counter or register 80. Digit counter or register 80 comprises a series of counter or register units 81–1 to 81–7 inclusive, which are sequentially actuated by the sequential receipt of a series of digits constituted by the number on the punched card 29. A first digit in a number registers in one of number counters 74–1 through 74–0. If the first digit is the number 2, then digit counter 74–2 will register that number and pass same by a conductor 56 through the spring-biased ball member contact element 47 to digit bus $D_1$ which will then register and be stored in digit unit 81–1. Registration of such a number in digit storage unit 81–1 then conditions digit register 81–2 for receipt of the next digit. If the next succeeding digit from analog circuit 71 is a 3, then numbers counter 74–3 will be actuated to pass a pulse through conductor 57 and the aperture in the card 47.

Should the second series of pulses passed by analog circuit 71 be a series of pulses such as the pulses corresponding to the digit 4, then number counter 74–4 would register that digit. However, since there are no openings in row 4 of card 29, there will be no connection made in the crossbar matrix between conductor 58 and digit bus $D_2$ and, accordingly, there will be no registration of a number in digit register 81–2. This constitutes a rejection of the incoming number since it does not correspond to the number set up or punched into card 29. All succeeding digits passed by analog circuit 71, while registering in the respective numbers counters 74–1 through 74–0, will be of no effect even though they could correspond to the remaining numbers set up in card 29. It will be apparent therefore that any sequence of digits passed by analog circuit 71 which correspond to the sequence of digits set up in card 29 by the punched holes will actuate in sequence digit registers 81–1 through 81–7. When digit register 81–7 is actuated, there is a signal that the correct number for the digit sequence comprising the number or hole or aperture pattern in card 29 has been received and that the mobile unit containing same has been dialed by some distant party. Accordingly, upon actuation or energization of unit 81–7, a buzzer and/or light or other alarm 82 will be actuated in unit 12. Alternatively, whenever digit unit 81–7 has been actuated upon receipt of a proper sequence of digits for the telephone number 239–8132, should the system have a dial tone signal then such may be connected directly to the handset unit 12 from analog circuit 71 so as to ring a conventional telephone alarm signal.

After a predetermined time interval following receipt of the last set of dial pulses in an incoming call number, the numbers counter 73 and digit register 80 are reset to receive the next call number and analyze same as described earlier.

It will be apparent therefore in view of the foregoing that card 29 when punched in accordance with any desired number of digits in any given sequence will cause the telephone to respond to that number and that number only. While the system heretofore described in connection with a 7-digit number, it will be readily apparent that the invention may be adapted to systems utilizing more or less than 7 digits.

Figure 9:
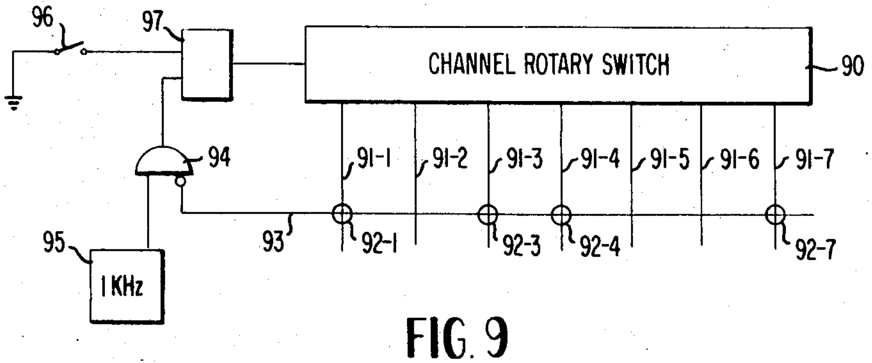
FIG. 9 is a partial circuit diagram the channel change and control circuit.

Normally, radio telephone systems in various localities have seven channels available for use and it is desirable that card 29 be utilized to facilitate selection of certain channels and prevent operation on other channels. Accordingly, one row of holes in card 29, say row 40A is assigned for channel selection purposes. With reference to FIG. 9, a motor driven channel rotary selector switch 90 has the outputs thereof supplied via conductors 91–1, 91–2 —91–7 through the crossbar matrix via ball contact elements 47 shown in FIG. 7. In FIG. 9, holes 92–1, 92–3, 92–4, and 92–7 are in aperture positions 1, 3, 4 and 7 or row 40A of card 29. Aperture position 2, 5 and 6 are not punched so that the card renders the unit operable only on channels 1, 3, 4 or 7. All of ball contact elements 47 in row 40A (not illustrated in FIG. 9) pass through an aperture 92–*n* in control card 29 where there is an aperture in an aperture position and make contact with contact strips $93_S$ which are connected to serve as one input via lead 92 to gate circuit 94. Any input to gate circuit 94 is used to gate fast-rate pulse generator 95 which has a 1kHz. output. When a channel is selected via a hole, say 92–1, in card 29, a manual operation of the channel switch 96 via gate circuit 97 allows the channel rotary switch 90 to stop on that channel in the following manner: As the manual change switch 96 is momentarily depressed, gate 97 passes a signal to initiate operation of switch 90, channel selection switch 90 then stops on the next selected channel (one of channels 1, 3, 4 or 7) and, when the pulses from the 1kHz. CP generator 95 bypasses by unselected channels 2, 5 and 6. The channel rotary selector channels but cannot stop on an unselected channel. Rotary channel selector switch 90 may be a part of the conventional transceiver channel selection device in the transceiver unit 11.

Figure 10:
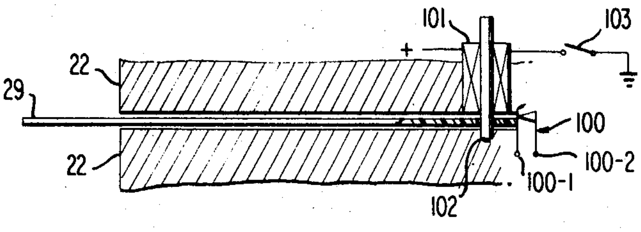
FIG. 10 is a diagrammatic illustration of the electromechanical interlock and tie with the ignition system of a vehicle equipped with a mobile radiotelephone unit incorporating the invention.

In order to prevent unauthorized use of the unit, the electromechanical interlock and on-off switch shown in FIG. 10 may be utilized. When card 29 is inserted into the space in the crossbar field, and pushed all the way in, it closes on-off switch 100 which then supplies power to the transceiver circuitry and the associated equipment via terminals 100-1 and 100-2. However, card 29 is prevented from engaging and actuating switch 100 if the ignition key has not been placed in the ignition and turned "on." This is accomplished by means of a solenoid 100-1 which has a plunger 102 which is normally in the position shown in FIG. 10, namely blocking the access to switch 100 by card 29. The coil of solenoid 101 is connected in circuit with the battery of the vehicle through ignition switch 103 so that when the ignition switch 103 is turned on or closed by the key in the ignition of the vehicle, solenoid 101 is energized to retract plunger 102 and open the access to switch 100 by card 29. In addition, a hole 104 in card 29 is aligned up with plunger 102 so that when the ignition switch is turned "off" and solenoid 101 is deenergized, the plunger passes through the aperture or hole 104 to thus lock the card in the slot so that the card cannot be removed. This prevents unauthorized use of the transceiver equipment first by preventing unauthorized use unless the persons seeking to use it has both the ignition key and the card. A further unauthorized use prevention not disclosed may be to perforate holes in row 40B of card 29 in a permutated code which would be effective to control a further power "on-off" switch (not shown).

It is apparent from the foregoing description that the card control radiotelephone device of this invention is relatively simple and adaptable to various forms of radiotelephone equipment, particularly mobile radiotelephone equipment. The embodiment of the invention shown in the drawings and described above has been given by way of illustration and not by way of limitation and that the invention is subject to variations and modifications without the departing from the scope of the present invention. All such variations and modifications are to be included within the scope of the present invention as set forth in the claims appended hereto.

I claim:

1. In a card controlled telephone number responding device for rendering a radiotransceiver in a radiotelephone system responsive to a received call number matching a number stored on a card, said radio transceiver including means for receiving a call signal bearing information representing the digits of a number stored on said card,
- means for converting said call signal to sets of dial pulses, in the sequence received digit for received digit,
- counter means for converting each set of said dial pulse sets to a digit corresponding to the number of said dial pulses, said counter having an output corresponding to each digit,
- a crossbar matrix having rows and columns of matrix cross-points,
- means connecting one side of said crossbar matrix to the outputs of said counter means, digit for digit,
- a call number bearing control card,
- means guiding said control card into registry with said crossbar matrix,
- said control card having a plurality of matrix positions corresponding in number and position to the number and positions of said matrix cross-points, selected ones of said positions on said card having means for making a cross-point connection in said crossbar matrix,
- digit sequence storage means,
- said digit sequence storage means comprising a plurality of cascaded digit storage register circuits, each having as one input an output from said matrix and each of said trigger circuits except the first being rendered operable in sequence from the second to the last on operation of a preceding trigger and an output from said matrix at a corresponding cross-point made by said means on said card for making a cross-point connection at a selected position, respectively,
- an alarm device actuated on actuation of the last of said trigger circuits,
- means for mounting said radio transceiver on a vehicle having a key-operated ignition switch, and
- means connectable in circuit with said ignition switch for preventing insertion of said control card into operative relationship with said crossbar matrix unless the ignition switch has been turned on by a key therein.

2. The invention defined in claim 1, wherein said means includes a reciprocatable plunger normally blocking passage of said control card to operative relation with said crossbar matrix,
- a solenoid for actuating said plunger, conductors connecting said solenoid in circuit with a power supply on the vehicle,
- a switch in series circuit with said conductors,
- said control card having an interlock aperture therein whereby said plunger traverses said interlock aperture upon deenergization of said solenoid to prevent withdrawal of said card upon opening of said ignition switch and prevents introduction of said card into said operative relationship when said ignition key switch has not been actuated.

3. In a radio telephone system improvements in devices for the conditioning of an individual unit in said system to respond only to an assigned telephone number comprising,
- an electromechanical call number selection matrix having a plurality of opposed conductors on opposite sides thereof,
- means operating in response to received dial signals for supplying digits in accordance with received numbers to conductors on one side of said matrix,
- an apertured insulated card insertable into operative relationship between opposed conductors and permitting selected ones thereof to make contact through permutated aperture positions in said card,
- a digit register on the other side of said number selection matrix for sequential registration of digits supplied thereto through apertures in said card,
- alarm means operated in response to registration of the assigned number in said digit register,
- means mounting said individual unit on a vehicle having a key-operated ignition switch, and
- means connectable in circuit with said ignition switch for preventing insertion of said insulated card into operative relationship unless said ignition switch has been turned on.